(12) United States Patent
Lee et al.

(10) Patent No.: US 11,968,148 B2
(45) Date of Patent: Apr. 23, 2024

(54) METHOD AND APPARATUS FOR TRANSMITTING OR RECEIVING HARQ FEEDBACK FOR MULTICAST/BROADCAST SIGNAL

(71) Applicant: LG Electronics Inc., Seoul (KR)

(72) Inventors: Youngdae Lee, Seoul (KR); Suckchel Yang, Seoul (KR); Seonwook Kim, Seoul (KR); Joonkui Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 306 days.

(21) Appl. No.: 17/396,214

(22) Filed: Aug. 6, 2021

(65) Prior Publication Data

US 2022/0045827 A1 Feb. 10, 2022

Related U.S. Application Data

(60) Provisional application No. 63/062,436, filed on Aug. 6, 2020.

(51) Int. Cl.
*H04L 5/00* (2006.01)
*H04L 1/1607* (2023.01)
*H04L 1/1812* (2023.01)
*H04W 72/21* (2023.01)
*H04W 72/23* (2023.01)
*H04W 72/30* (2023.01)

(52) U.S. Cl.
CPC .......... *H04L 5/0055* (2013.01); *H04L 1/1671* (2013.01); *H04L 1/1812* (2013.01); *H04W 72/21* (2023.01); *H04W 72/23* (2023.01); *H04W 72/30* (2023.01)

(58) Field of Classification Search
CPC ... H04L 1/1671; H04L 1/1812; H04L 1/1861; H04L 1/1896; H04L 2001/0093; H04L 5/0023; H04L 5/0051; H04L 5/0055; H04L 5/0094; H04W 72/21; H04W 72/23; H04W 72/30
See application file for complete search history.

(56) References Cited

U.S. PATENT DOCUMENTS

| 10,009,920 | B2 * | 6/2018 | Rico Alvarino | H04L 1/16 |
|---|---|---|---|---|
| 11,115,162 | B2 * | 9/2021 | Kim | H04W 72/044 |
| 11,540,310 | B2 * | 12/2022 | Fakoorian | H04L 1/1896 |
| 11,558,904 | B2 * | 1/2023 | Lin | H04W 72/0446 |
| 2011/0105107 | A1 * | 5/2011 | Kwon | H04L 5/0098 |
| | | | | 455/422.1 |

(Continued)

OTHER PUBLICATIONS

U.S. Appl. No. 63/014,648 (Year: 2020).*
U.S. Appl. No. 63/001,223 (Year: 2020).*

*Primary Examiner* — Dung B Huynh
(74) *Attorney, Agent, or Firm* — Fish & Richardson P.C.

(57) ABSTRACT

Disclosed herein is a terminal configured to receive information about one or more periodic uplink resources for transmission of HARQ-ACK information for multicast data, monitor a PDCCH in a search space for multicast configured on a specific downlink frequency resource, and detect DCI having a CRC scrambled with a G-RNTI. On a basis that the DCI indicates a specific index, and at least one of the one or more periodic uplink resources is associated with the specific index indicated by the DCI, the terminal may transmit an activation confirmation message to activate the at least one periodic uplink resource associated with the specific index.

12 Claims, 11 Drawing Sheets

(56) References Cited

U.S. PATENT DOCUMENTS

| | | | |
|---|---|---|---|
| 2012/0147873 A1* | 6/2012 | Cheng | H04W 56/00 370/338 |
| 2015/0334688 A1* | 11/2015 | Kim | H04L 5/0053 370/329 |
| 2015/0382372 A1* | 12/2015 | Vajapeyam | H04W 72/1263 370/329 |
| 2016/0007324 A1* | 1/2016 | Lee | H04L 1/1671 370/329 |
| 2017/0295567 A1* | 10/2017 | Chen | H04W 4/70 |
| 2017/0325277 A1* | 11/2017 | Fujishiro | H04W 4/06 |
| 2018/0049224 A1* | 2/2018 | Dinan | H04W 72/21 |
| 2018/0262882 A1* | 9/2018 | You | H04W 72/30 |
| 2018/0368174 A1* | 12/2018 | Jeon | H04W 72/044 |
| 2019/0007176 A1* | 1/2019 | Ozturk | H04L 1/1816 |
| 2019/0090222 A1* | 3/2019 | Wu | H04W 72/20 |
| 2019/0097772 A1* | 3/2019 | Yang | H04B 7/0695 |
| 2019/0104539 A1* | 4/2019 | Park | H04W 72/23 |
| 2019/0207737 A1* | 7/2019 | Babaei | H04L 5/0098 |
| 2019/0245657 A1* | 8/2019 | Lee | H04L 1/1835 |
| 2020/0068528 A1* | 2/2020 | Abraham | H04L 1/1854 |
| 2020/0163061 A1* | 5/2020 | Tang | H04W 72/23 |
| 2020/0235861 A1* | 7/2020 | Belleschi | H04L 1/1614 |
| 2020/0244410 A1* | 7/2020 | Kim | H04W 72/542 |
| 2020/0245335 A1* | 7/2020 | Joseph | H04W 76/11 |
| 2020/0314681 A1* | 10/2020 | Kuo | H04W 72/23 |
| 2020/0359409 A1* | 11/2020 | Karaki | H04W 72/0446 |
| 2020/0404633 A1* | 12/2020 | Zhou | H04L 5/0053 |
| 2020/0404671 A1* | 12/2020 | Karaki | H04L 5/0091 |
| 2021/0006318 A1* | 1/2021 | Kim | H04L 1/1867 |
| 2021/0068079 A1* | 3/2021 | Sahin | H04W 72/121 |
| 2021/0127359 A1* | 4/2021 | Takeda | H04L 5/0092 |
| 2021/0195618 A1* | 6/2021 | Yuan | H04W 72/535 |
| 2021/0243778 A1* | 8/2021 | Takeda | H04W 72/0453 |
| 2021/0250905 A1* | 8/2021 | Liu | H04L 5/0055 |
| 2021/0307055 A1* | 9/2021 | Tsai | H04W 76/38 |
| 2021/0314796 A1* | 10/2021 | Hoang | H04W 52/36 |
| 2021/0337625 A1* | 10/2021 | Tsai | H04W 76/30 |
| 2021/0367745 A1* | 11/2021 | Zhao | H04W 72/23 |
| 2021/0368534 A1* | 11/2021 | Sato | H04W 72/1268 |
| 2021/0377876 A1* | 12/2021 | Jeon | H04W 24/08 |
| 2021/0410114 A1* | 12/2021 | Lee | H04L 1/189 |
| 2021/0410177 A1* | 12/2021 | Takeda | H04W 72/044 |
| 2022/0124792 A1* | 4/2022 | Fu | H04W 72/1263 |
| 2022/0132557 A1* | 4/2022 | Kuo | H04L 1/0009 |
| 2022/0182945 A1* | 6/2022 | Hosseini | H04W 52/146 |
| 2022/0201742 A1* | 6/2022 | Zhao | H04W 72/0453 |
| 2022/0209906 A1* | 6/2022 | Han | H04W 72/23 |
| 2022/0210823 A1* | 6/2022 | Alfarhan | H04L 1/1887 |
| 2022/0217506 A1* | 7/2022 | Xu | H04W 4/06 |
| 2022/0232618 A1* | 7/2022 | Awad | H04W 72/21 |
| 2022/0330213 A1* | 10/2022 | Lee | H04L 5/0055 |
| 2022/0407646 A1* | 12/2022 | Yoshioka | H04W 4/06 |
| 2023/0028180 A1* | 1/2023 | Lee | H04W 72/23 |
| 2023/0086144 A1* | 3/2023 | Roy | H04L 5/005 |
| 2023/0088550 A1* | 3/2023 | Wang | H04L 1/1848 370/329 |
| 2023/0093727 A1* | 3/2023 | Lin | H04L 1/0061 370/312 |
| 2023/0094549 A1* | 3/2023 | Matsumura | H04B 7/0404 375/267 |
| 2023/0096989 A1* | 3/2023 | Lee | H04L 1/1861 370/329 |
| 2023/0141487 A1* | 5/2023 | Chin | H04W 76/30 370/328 |
| 2023/0180269 A1* | 6/2023 | Li | H04W 72/30 370/312 |
| 2023/0180276 A1* | 6/2023 | Gerami | H04W 72/23 370/329 |
| 2023/0209313 A1* | 6/2023 | Chin | H04W 4/06 370/329 |
| 2023/0209507 A1* | 6/2023 | Liu | H04W 72/02 370/329 |
| 2023/0224099 A1* | 7/2023 | Chen | H04L 1/189 370/329 |
| 2023/0337286 A1* | 10/2023 | Zhang | H04W 76/19 |

* cited by examiner

Non - interleaved CCE - to - REG mapping

METHOD AND APPARATUS FOR TRANSMITTING OR RECEIVING HARQ FEEDBACK FOR MULTICAST/BROADCAST SIGNAL

CROSS-REFERENCE TO RELATED APPLICATIONS

This application claims the benefit of U.S. Provisional Patent Application No. 63/062,436, filed on Aug. 6, 2020, which is hereby incorporated by reference as if fully set forth herein.

TECHNICAL FIELD

The present disclosure relates to a wireless communication system, and more particularly, to a method and apparatus for transmitting/receiving a wireless signal.

BACKGROUND

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may be any of a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

SUMMARY

An object of the present disclosure is to provide a method of efficiently performing wireless signal transmission/reception procedures and an apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

In one aspect of the present disclosure, a method for transmitting a signal by a terminal in a wireless communication system may include receiving information about one or more periodic uplink resources for transmission of hybrid automatic repeat request-acknowledgement (HARQ-ACK) information for multicast data, monitoring a physical downlink control channel (PDCCH) in a search space for multicast configured on a specific downlink frequency resource, and detecting, as a result of the monitoring of the PDCCH, downlink control information (DCI) having a cyclic redundancy check (CRC) scrambled with a group-radio network temporary identifier (G-RNTI), wherein, on a basis that the DCI indicates a specific index, and at least one of the one or more periodic uplink resources is associated with the specific index indicated by the DCI, an activation confirmation message may be transmitted to activate the at least one periodic uplink resource associated with the specific index.

The activation confirmation message may be transmitted through the at least one periodic uplink resource associated with the specific index.

The HARQ-ACK information for the multicast data may be transmitted after activation of the at least one periodic uplink resource.

The activation confirmation message or the HARQ-ACK information for the multicast data may be transmitted on a basis that a timer for uplink timing of the terminal is valid.

Transmission of the activation confirmation message or the HARQ-ACK information for the multicast data may not be allowed after the timer for uplink timing of the terminal expires.

The specific index may be a periodic uplink resource identifier.

The specific downlink frequency resource may be related to an active bandwidth part (BWP) of the terminal.

The activation confirmation message or the HARQ-ACK information for the multicast data may be transmitted as at least part of uplink control information (UCI).

The UCI may be transmitted on a physical uplink shared channel (PUSCH).

In another aspect of the present disclosure, a computer-readable recording medium having a program recorded thereon for executing the signal transmission method described above may be provided.

In another aspect of the present disclosure, a terminal for carrying out the above-described signal transmission method may be provided.

In another aspect of the present disclosure, a device for controlling the terminal for carrying out the above-described signal transmission method may be provided.

In another aspect of the present disclosure, a method for receiving a signal by a base station in a wireless communication system may include transmitting information about one or more periodic uplink resources for transmission of hybrid automatic repeat request-acknowledgement (HARQ-ACK) information for multicast data, and transmitting, in a search space for multicast configured on a specific downlink frequency resource, a physical downlink control channel (PDCCH) carrying downlink control information (DCI) having a cyclic redundancy check (CRC) scrambled with a group-radio network temporary identifier (G-RNTI), wherein the base station may be configured to attempt to receive an activation confirmation message from a terminal on a basis that the DCI indicates a specific index, and at least one of the one or more periodic uplink resources is associated with the specific index indicated by the DCI, and on a basis that the activation confirmation message is received, determine that activation of the at least one periodic uplink resource is successful for the terminal.

In another aspect of the present disclosure, a base station for carrying out the signal reception method described above may be provided.

According to an embodiment of the present disclosure, UL resources may be periodically configured for HARQ-ACK transmission related to transmission of downlink multicast data, and thus the overhead of UL resource allocation may be reduced. Further, even when a dynamic activation indication related to UL resources is used, activation of UL resources is completed only when an activation confirmation is received from a terminal. Thereby, mismatch of UL resources between the terminal and a base station may be prevented.

It will be appreciated by persons skilled in the art that the effects that can be achieved with the present disclosure are not limited to what has been particularly described hereinabove and other advantages of the present disclosure will be

DETAILED DESCRIPTION

Figure 1:
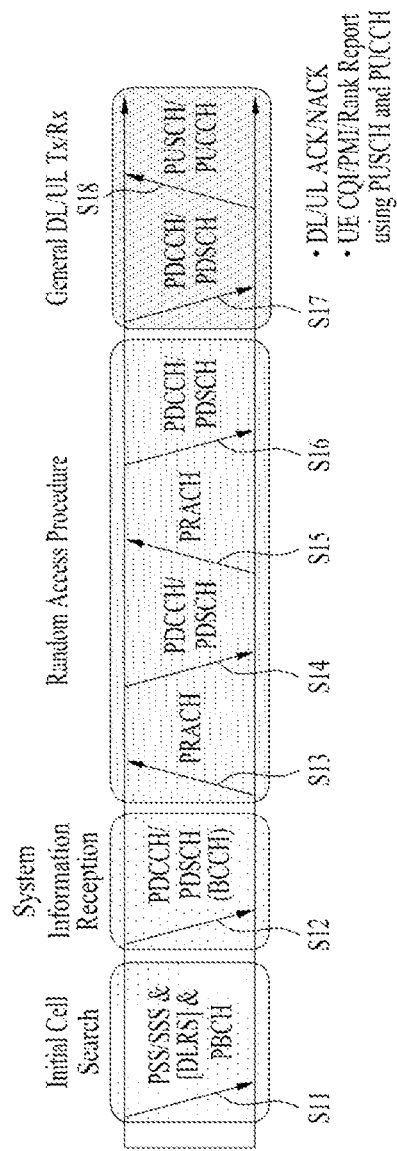
FIG. 1 illustrates physical channels used in a 3rd generation partnership project (3GPP) system, which is an example of wireless communication systems, and a general signal transmission method using the same.

Embodiments of the present disclosure are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

As more and more communication devices require a larger communication capacity, there is a need for mobile broadband communication enhanced over conventional radio access technology (RAT). In addition, massive Machine Type Communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and Ultra-Reliable and Low Latency Communication (URLLC) is being discussed. In the present disclosure, for simplicity, this technology will be referred to as NR (New Radio or New RAT).

For the sake of clarity, 3GPP NR is mainly described, but the technical idea of the present disclosure is not limited thereto.

Details of the background, terminology, abbreviations, etc. used herein may be found in 3GPP standard documents published before the present disclosure.

Following documents are incorporated by reference:

3GPP LTE

TS 36.211: Physical channels and modulation
TS 36.212: Multiplexing and channel coding
TS 36.213: Physical layer procedures
TS 36.300: Overall description
TS 36.321: Medium Access Control (MAC)
TS 36.331: Radio Resource Control (RRC)

3GPP NR

TS 38.211: Physical channels and modulation
TS 38.212: Multiplexing and channel coding
TS 38.213: Physical layer procedures for control
TS 38.214: Physical layer procedures for data
TS 38.300: NR and NG-RAN Overall Description
TS 38.321: Medium Access Control (MAC)
TS 38.331: Radio Resource Control (RRC) protocol specification

Abbreviations and Terms

PDCCH: Physical Downlink Control CHannel
PDSCH: Physical Downlink Shared CHannel
PUSCH: Physical Uplink Shared CHannel
CSI: Channel state information
RRM: Radio resource management
RLM: Radio link monitoring
DCI: Downlink Control Information
CAP: Channel Access Procedure
Ucell: Unlicensed cell
PCell: Primary Cell
PSCell: Primary SCG Cell
TBS: Transport Block Size
SLIV: Starting and Length Indicator Value
BWP: BandWidth Part
CORESET: COntrol REsourse SET
REG: Resource element group
SFI: Slot Format Indicator
COT: Channel occupancy time
SPS: Semi-persistent scheduling
PLMN ID: Public Land Mobile Network identifier
RACH: Random Access Channel
RAR: Random Access Response
MBMS: Multimedia Broadcast/Multicast Service
Msg3: Message transmitted on UL-SCH containing a C-RNTI MAC CE or CCCH SDU, submitted from upper layer and associated with the UE Contention Resolution Identity, as part of a Random Access procedure.
Special Cell: For Dual Connectivity operation the term Special Cell refers to the PCell of the MCG or the PSCell of the SCG depending on if the MAC entity is associated to the MCG or the SCG respectively. Otherwise the term Special Cell refers to the PCell. A Special Cell supports PUCCH transmission and contention-based Random Access, and is always activated.

Serving Cell: A PCell, a PSCell, or an SCell

MBSFN Synchronization Area: (in case of LTE) an area of the network where all eNodeBs can be synchronized and perform MBSFN transmissions. MBSFN Synchronization Areas are capable of supporting one or more MBSFN Areas. On a given frequency layer, eNodeB can only belong to one MBSFN Synchronization Area. MBSFN Synchronization Areas are independent from the definition of MBMS Service Areas.

MBSFN Transmission or a transmission in MBSFN mode: a simultaneous broadcast scheme performed by transmitting the same waveforms at the same time from multiple cells. An MBSFN Transmission from multiple cells within the MBSFN Area is seen as a single transmission by a UE.

MBSFN Area: an MBSFN Area consists of a group of cells within an MBSFN Synchronization Area of a network, which are co-ordinated to achieve an MBSFN Transmission. Except for the MBSFN Area Reserved Cells, all cells within an MBSFN Area contribute to the MBSFN Transmission and advertise its availability. The UE may only need to consider a subset of the configured MBSFN area (i.e., service(s) in interest).

In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

FIG. 1 illustrates physical channels used in a 3GPP NR system and a general signal transmission method using the same.

When a UE is powered on again from a power-off state or enters a new cell, the UE performs an initial cell search procedure, such as establishment of synchronization with a BS, in step S101. To this end, the UE receives a synchronization signal block (SSB) from the BS. The SSB includes a primary synchronization signal (PSS), a secondary synchronization signal (SSS), and a physical broadcast channel (PBCH). The UE establishes synchronization with the BS based on the PSS/SSS and acquires information such as a cell identity (ID). The UE may acquire broadcast information in a cell based on the PBCH. The UE may receive a DL reference signal (RS) in an initial cell search procedure to monitor a DL channel status.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
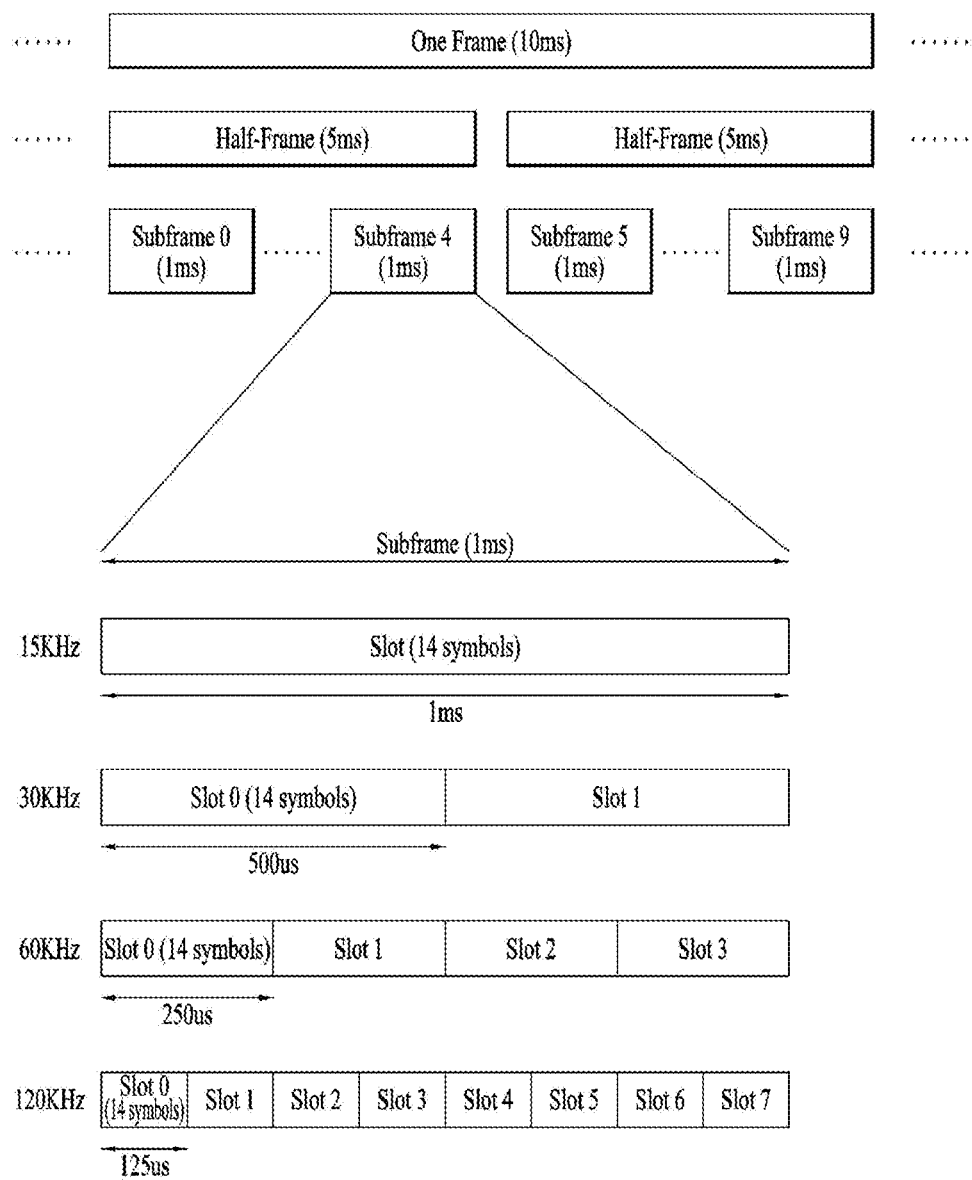
FIG. 2 illustrates a radio frame structure.

FIG. 2 illustrates a radio frame structure. In NR, uplink and downlink transmissions are configured with frames. Each radio frame has a length of 10 ms and is divided into two 5-ms half-frames (HF). Each half-frame is divided into five 1-ms subframes (SFs). A subframe is divided into one or more slots, and the number of slots in a subframe depends on subcarrier spacing (SCS). Each slot includes 12 or 14 Orthogonal Frequency Division Multiplexing (OFDM) symbols according to a cyclic prefix (CP). When a normal CP is used, each slot includes 14 OFDM symbols. When an extended CP is used, each slot includes 12 OFDM symbols.

Table 1 exemplarily shows that the number of symbols per slot, the number of slots per frame, and the number of slots per subframe vary according to the SCS when the normal CP is used.

TABLE 1

| SCS (15 * $2^u$) | $N_{symb}^{slot}$ | $N_{slot}^{frame,u}$ | $N_{slot}^{subframe,u}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

* $N_{symb}^{slot}$: Number of symbols in a slot
* $N_{slot}^{frame,u}$: Number of slots in a frame
* $N_{slot}^{subframe,u}$: Number of slots in a subframe Table 2 illustrates that the number of symbols per slot, the number of slots per frame, and the number of slots per subframe vary according to the SCS when the extended CP is used.

TABLE 2

| SCS (15 * $2^u$) | $N_{symb}^{slot}$ | $N_{slot}^{frame,u}$ | $N_{slot}^{subframe,u}$ |
|---|---|---|---|
| 60 KHz (u = 2) | 12 | 40 | 4 |

The structure of the frame is merely an example. The number of subframes, the number of slots, and the number of symbols in a frame may vary.

In the NR system, OFDM numerology (e.g., SCS) may be configured differently for a plurality of cells aggregated for one UE. Accordingly, the (absolute time) duration of a time resource (e.g., an SF, a slot or a TTI) (for simplicity, referred to as a time unit (TU)) consisting of the same number of symbols may be configured differently among the aggregated cells. Here, the symbols may include an OFDM symbol (or a CP-OFDM symbol) and an SC-FDMA symbol (or a discrete Fourier transform-spread-OFDM (DFT-s-OFDM) symbol).

Figure 3:
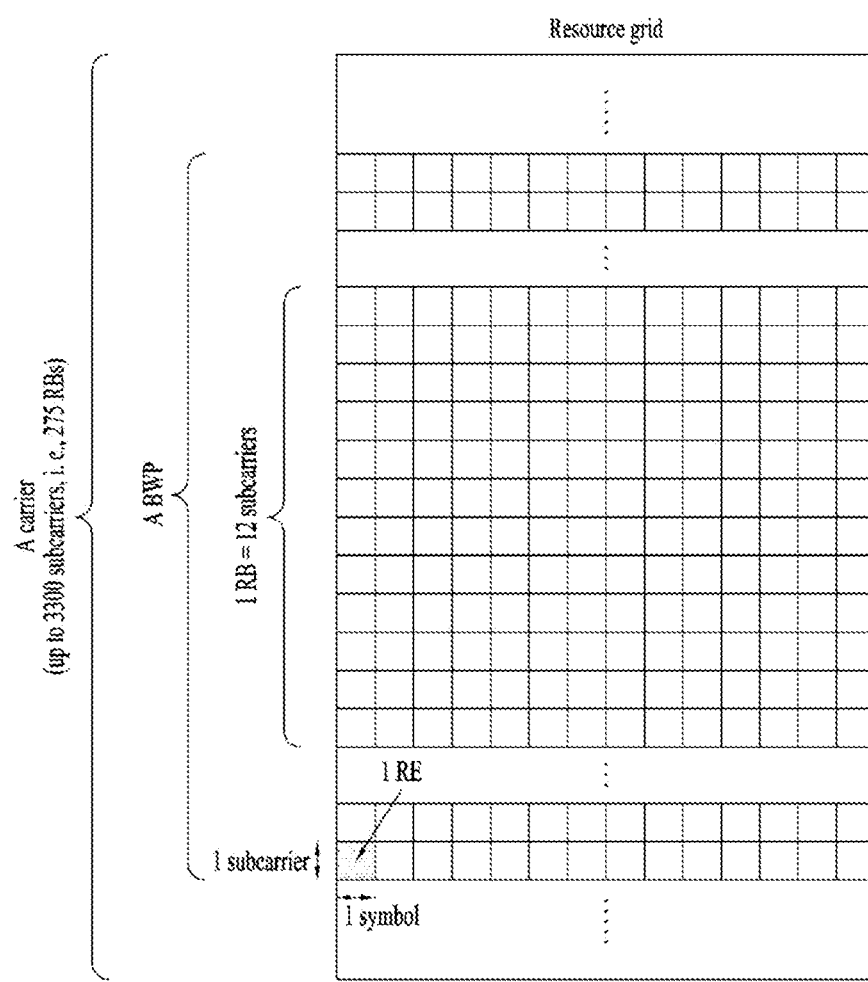
FIG. 3 illustrates a resource grid of a slot.

FIG. 3 illustrates a resource grid of a slot. A slot includes a plurality of symbols in the time domain. For example, when the normal CP is used, the slot includes 14 symbols. However, when the extended CP is used, the slot includes 12 symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) may be defined to be a plurality of consecutive physical RBs (PRBs) in the frequency domain and correspond to a single numerology (e.g., SCS, CP length, etc.). The carrier may include up to N (e.g., 5) BWPs. Data communication may be performed through an activated BWP, and only one BWP may be activated for one UE. In the resource grid, each element is referred to as a resource element (RE), and one complex symbol may be mapped to each RE.

Figure 4:
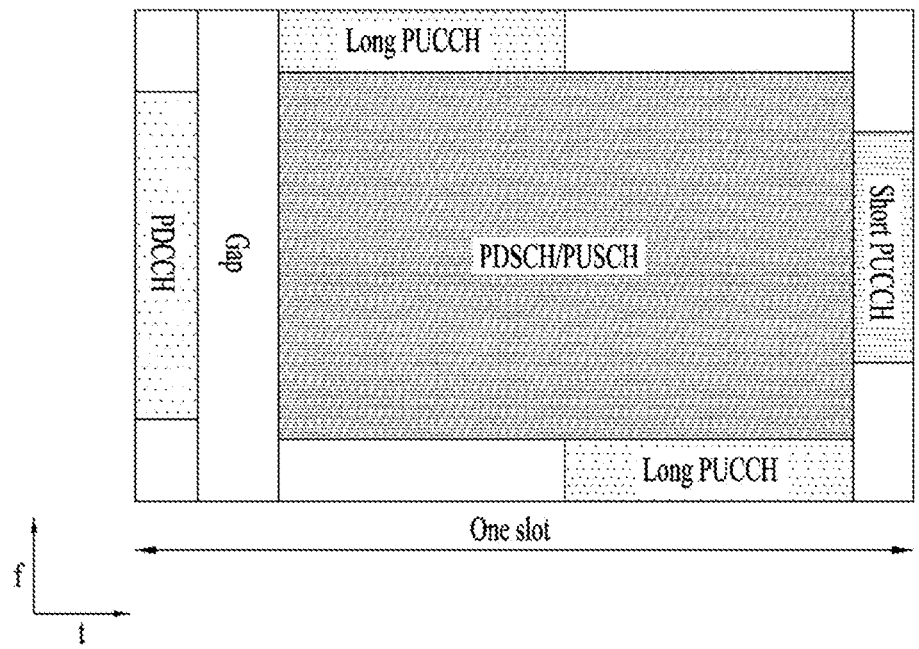
FIG. 4 illustrates exemplary mapping of physical channels in a slot.

FIG. 4 illustrates exemplary mapping of physical channels in a slot. In the NR system, a frame is characterized by a self-contained structure in which all of a DL control channel, DL or UL data, and a UL control channel may be included in one slot. For example, the first N symbols (hereinafter, referred to as a DL control region) of a slot may be used to transmit a DL control channel (e.g., PDCCH), and the last M symbols (hereinafter, referred to as a UL control region) of the slot may be used to transmit a UL control channel (e.g., PUCCH). Each of N and M is an integer equal to or larger than 0. A resource region (hereinafter, referred to as a data region) between the DL control region and the UL control region may be used to transmit DL data (e.g., PDSCH) or UL data (e.g., PUSCH). A guard period (GP) provides a time gap for transmission mode-to-reception mode switching or reception mode-to-transmission mode switching at a BS and a UE. Some symbol at the time of DL-to-UL switching in a subframe may be configured as a GP.

The PDCCH delivers DCI. For example, the PDCCH (i.e., DCI) may carry information about a transport format and resource allocation of a DL shared channel (DL-SCH), resource allocation information of an uplink shared channel (UL-SCH), paging information on a paging channel (PCH), system information on the DL-SCH, information on resource allocation of a higher-layer control message such as an RAR transmitted on a PDSCH, a transmit power control command, information about activation/release of configured scheduling, and so on. The DCI includes a cyclic redundancy check (CRC). The CRC is masked with various identifiers (IDs) (e.g. a radio network temporary identifier (RNTI)) according to an owner or usage of the PDCCH. For example, if the PDCCH is for a specific UE, the CRC is masked by a UE ID (e.g., cell-RNTI (C-RNTI)). If the PDCCH is for a paging message, the CRC is masked by a paging-RNTI (P-RNTI). If the PDCCH is for system information (e.g., a system information block (SIB)), the CRC is masked by a system information RNTI (SI-RNTI). When the PDCCH is for an RAR, the CRC is masked by a random access-RNTI (RA-RNTI).

Figure 5:
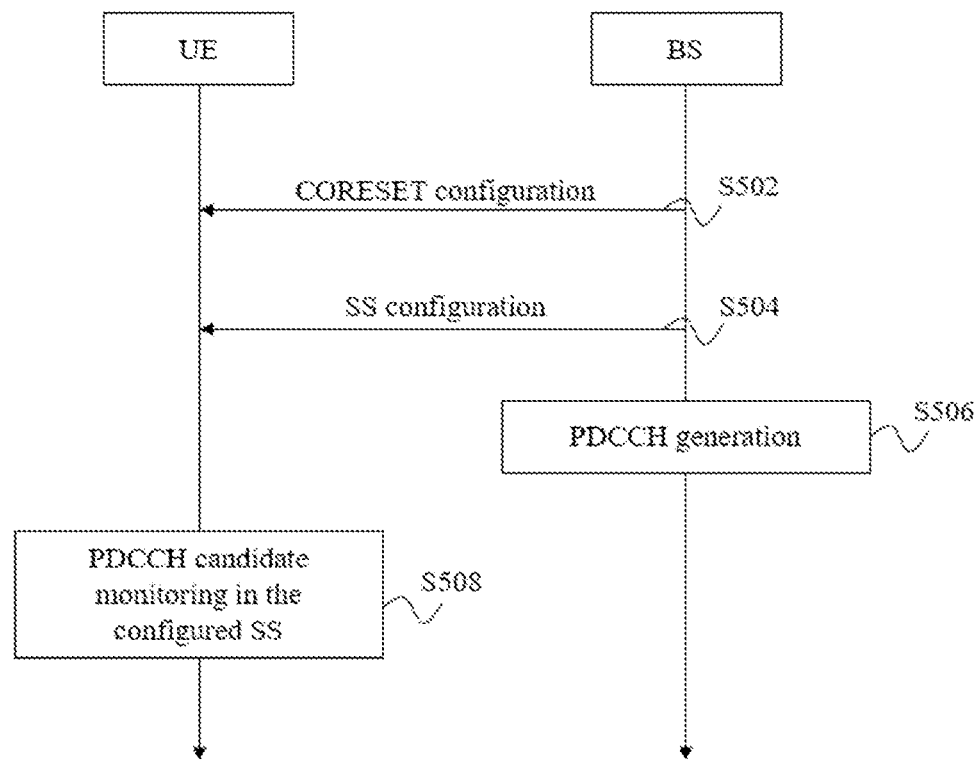
FIG. 5 is a diagram illustrating a signal flow for a physical downlink control channel (PDCCH) transmission and reception process.

FIG. 5 is a diagram illustrating a signal flow for a PDCCH transmission and reception process.

Referring to FIG. 5, a BS may transmit a control resource set (CORESET) configuration to a UE (S502). A CORSET is defined as a resource element group (REG) set having a given numerology (e.g., an SCS, a CP length, and so on). An REG is defined as one OFDM symbol by one (P)RB. A plurality of CORESETs for one UE may overlap with each other in the time/frequency domain. A CORSET may be configured by system information (e.g., a master information block (MIB)) or higher-layer signaling (e.g., radio resource control (RRC) signaling). For example, configuration information about a specific common CORSET (e.g., CORESET #0) may be transmitted in an MIB. For example, a PDSCH carrying system information block 1 (SIB1) may be scheduled by a specific PDCCH, and CORSET #0 may be used to carry the specific PDCCH. Configuration information about CORESET #N (e.g., N>0) may be transmitted by RRC signaling (e.g., cell-common RRC signaling or UE-specific RRC signaling). For example, the UE-specific RRC signaling carrying the CORSET configuration information may include various types of signaling such as an RRC setup message, an RRC reconfiguration message, and/or BWP configuration information. Specifically, a CORSET configuration may include the following information/fields.

controlResourceSetId: indicates the ID of a CORESET.

frequencyDomainResources: indicates the frequency resources of the CORESET. The frequency resources of the CORESET are indicated by a bitmap in which each bit corresponds to an RBG (e.g., six (consecutive) RBs). For example, the most significant bit (MSB) of the bitmap corresponds to a first RBG RBGs corresponding to bits set to 1 are allocated as the frequency resources of the CORESET.

duration: indicates the time resources of the CORESET. Duration indicates the number of consecutive OFDM symbols included in the CORESET. Duration has a value of 1 to 3.

cce-REG-MappingType: indicates a control channel element (CCE)-REG mapping type. Interleaved and non-interleaved types are supported.

interleaverSize: indicates an interleaver size.

pdcch-DMRS-ScramblingID: indicates a value used for PDCCH DMRS initialization. When pdcch-DMRS-ScramblingID is not included, the physical cell ID of a serving cell is used.

precoderGranularity: indicates a precoder granularity in the frequency domain.

reg-BundleSize: indicates an REG bundle size.

tci-PresentInDCI: indicates whether a transmission configuration index (TCI) field is included in DL-related DCI.

tci-StatesPDCCH-ToAddList: indicates a subset of TCI states configured in pdcch-Config, used for providing quasi-co-location (QCL) relationships between DL RS(s) in an RS set (TCI-State) and PDCCH DMRS ports.

Further, the BS may transmit a PDCCH search space (SS) configuration to the UE (S504). The PDCCH SS configuration may be transmitted by higher-layer signaling (e.g., RRC signaling). For example, the RRC signaling may include, but not limited to, various types of signaling such as an RRC setup message, an RRC reconfiguration message, and/or BWP configuration information. While a CORESET configuration and a PDCCH SS configuration are shown in FIG. 5 as separately signaled, for convenience of description, the present disclosure is not limited thereto. For example, the CORESET configuration and the PDCCH SS configuration may be transmitted in one message (e.g., by one RRC signaling) or separately in different messages.

The PDCCH SS configuration may include information about the configuration of a PDCCH SS set. The PDCCH SS set may be defined as a set of PDCCH candidates monitored (e.g., blind-detected) by the UE. One or more SS sets may be configured for the UE. Each SS set may be a USS set or a CSS set. For convenience, PDCCH SS set may be referred to as "SS" or "PDCCH SS".

A PDCCH SS set includes PDCCH candidates. A PDCCH candidate is CCE(s) that the UE monitors to receive/detect a PDCCH. The monitoring includes blind decoding (BD) of PDCCH candidates. One PDCCH (candidate) includes 1, 2, 4, 8, or 16 CCEs according to an aggregation level (AL). One CCE includes 6 REGs. Each CORESET configuration is associated with one or more SSs, and each SS is associated with one CORESET configuration. One SS is defined based on one SS configuration, and the SS configuration may include the following information/fields.

searchSpaceId: indicates the ID of an SS.

controlResourceSetId: indicates a CORESET associated with the SS.

monitoringSlotPeriodicityAndOffset: indicates a periodicity (in slots) and offset (in slots) for PDCCH monitoring.

monitoringSymbolsWithinSlot: indicates the first OFDM symbol(s) for PDCCH monitoring in a slot configured with PDCCH monitoring. The first OFDM symbol(s) for PDCCH monitoring is indicated by a bitmap with each bit corresponding to an OFDM symbol in the slot. The MSB of the bitmap corresponds to the first OFDM symbol of the slot. OFDM symbol(s) corresponding to bit(s) set to 1 corresponds to the first symbol(s) of a CORESET in the slot.

nrofCandidates: indicates the number of PDCCH candidates (one of values 0, 1, 2, 3, 4, 5, 6, and 8) for each AL where AL={1, 2, 4, 8, 16}.

searchSpaceType: indicates common search space (CSS) or UE-specific search space (USS) as well as a DCI format used in the corresponding SS type.

Subsequently, the BS may generate a PDCCH and transmit the PDCCH to the UE (S506), and the UE may monitor PDCCH candidates in one or more SSs to receive/detect the PDCCH (S508). An occasion (e.g., time/frequency resources) in which the UE is to monitor PDCCH candidates is defined as a PDCCH (monitoring) occasion. One or more PDCCH (monitoring) occasions may be configured in a slot.

Table 3 shows the characteristics of each SS.

TABLE 3

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 4 shows DCI formats transmitted on the PDCCH.

TABLE 4

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |

TABLE 4-continued

| DCI format | Usage |
|---|---|
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or DL scheduling information. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to a corresponding group of UEs on a group common PDCCH which is a PDCCH directed to a group of UEs.

DCI format 0_0 and DCI format 1_0 may be referred to as fallback DCI formats, whereas DCI format 0_1 and DCI format 1_1 may be referred to as non-fallback DCI formats. In the fallback DCI formats, a DCI size/field configuration is maintained to be the same irrespective of a UE configuration. In contrast, the DCI size/field configuration varies depending on a UE configuration in the non-fallback DCI formats.

A CCE-to-REG mapping type is set to one of an interleaved type and a non-interleaved type.

Non-interleaved CCE-to-REG mapping (or localized CCE-to-REG mapping) (FIG. 5): 6 REGs for a given CCE are grouped into one REG bundle, and all of the REGs for the given CCE are contiguous. One REG bundle corresponds to one CCE.

Figure 6:
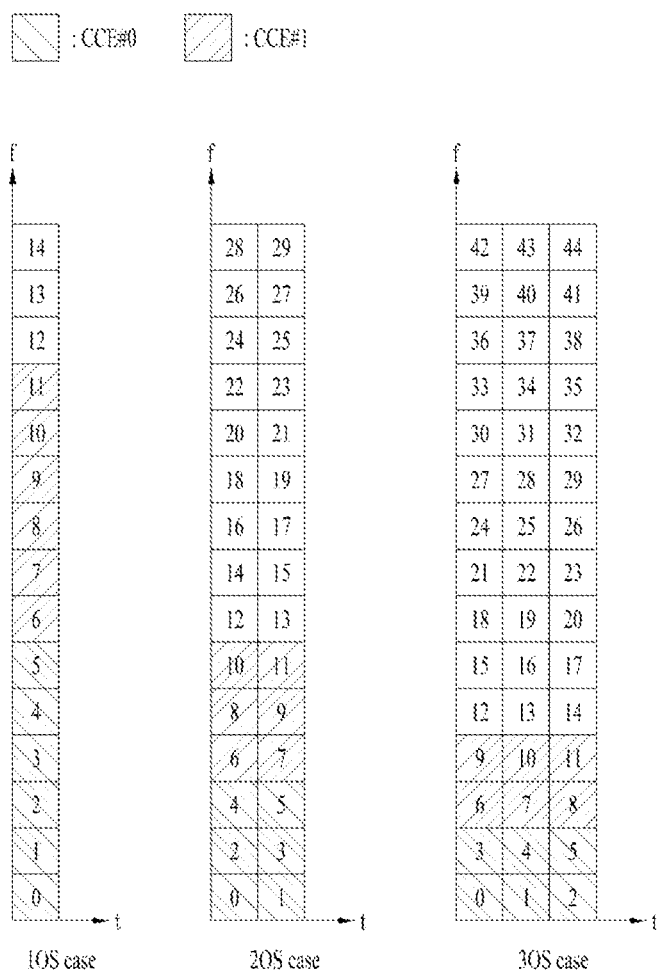
FIGS. 6 and 7 illustrate exemplary control resource set (CORESET) structures.
Figure 7:
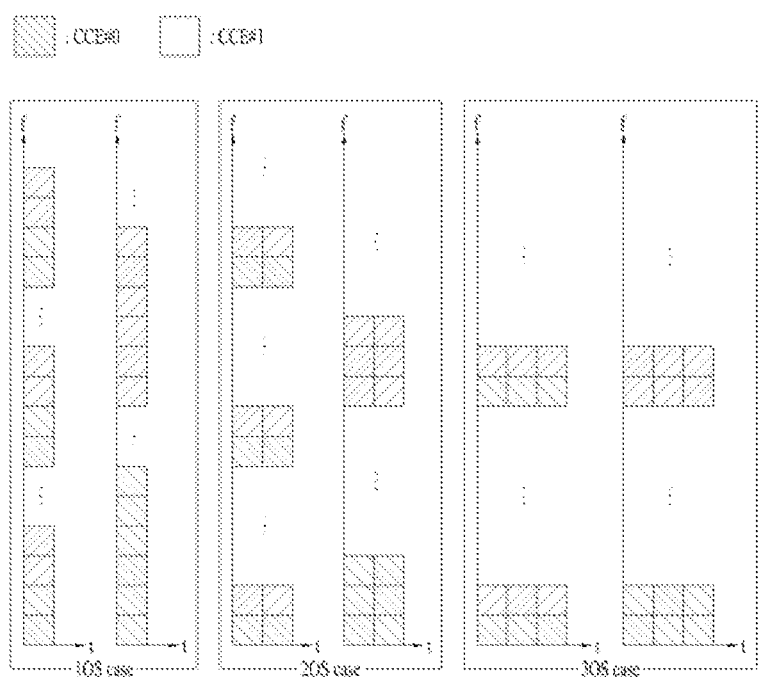

Interleaved CCE-to-REG mapping (or distributed CCE-to-REG mapping) (FIG. 6): 2, 3 or 6 REGs for a given CCE are grouped into one REG bundle, and the REG bundle is interleaved within a CORESET. In a CORESET including one or two OFDM symbols, an REG bundle includes 2 or 6 REGs, and in a CORESET including three OFDM symbols, an REG bundle includes 3 or 6 REGs. An REG bundle size is configured on a CORESET basis.

Multimedia Broadcast/Multicast Service (MBMS)

Next, the MBMS scheme of 3GPP LTE will be described. 3GPP MBMS may be divided into an SFN scheme, in which multiple BS cells are synchronized to transmit the same data on a PMCH channel, and a single cell point to multipoint (SC-PTM) scheme, in which multiple BS cells are synchronized to broadcast within a corresponding cell coverage on a PDCCH/PDSCH. The SFN scheme is used to provide a broadcast service in a wide area (e.g. MBMS area) through resources pre-allocated semi-statically, while the SC-PTM scheme is mainly used to provide a broadcast service only within a cell coverage through dynamic resources.

The SC-PTM provides one logical channel SC-MCCH (Single Cell Multicast Control Channel) and one or more logical channels SC-MTCHs (Single Cell Multicast Traffic Channels). These logical channels are mapped to a transmission channel DL-SCH and a physical channel PDSCH. The PDSCH carrying SC-MCCH or SC-MTCH data is scheduled on a PDCCH indicated by G-RNTI. In this case, a TMGI corresponding to a service ID may be mapped to a specific G-RNTI value in a one-to-one correspondence manner. Accordingly, when the BS provides a plurality of services, a plurality of G-RNTI values may be allocated for SC-PTM transmission. One or more UEs may perform PDCCH monitoring using a specific G-RNTI to receive a specific service. Here, an SC-PTM dedicated DRX on-duration period may be configured for the specific service/specific G-RNTI. In this case, the UEs wake up only in a specific on-duration period to perform PDCCH monitoring for the G-RNTI.

Periodic UL Resource Based Feedback for Broadcast and Multicast

The above-described configurations (3GPP system, frame structure, NR system, etc.) may be applied in combination with the methods described below according to the present disclosure, or may be supplemented to clarify the technical features of the methods proposed in the present disclosure. As used herein, "/" may mean "and," "or," or "and/or" depending on the context.

REL-17 NR intends to introduce a DL broadcast or DL multicast transmission scheme to support the MBMS service. A point-to-multipoint (PTM) transmission scheme such as MBMS enables transmission to multiple UEs with one DL broadcast/multicast to save radio resources for each UE compared to individual DL unicast transmission (i.e., point-to-point transmission).

In NR, a method by which the UE reports MBMS-related feedback (e.g., UL feedback of HARQ-ACK information related to a request for retransmission of MBMS data) to the BS is under discussion for reliable DL broadcast/multicast transmission. In this regard, a method allowing all idle/inactive/connected UEs to transmit MBMS-related feedback is required. Also, when the UE, which may receive a plurality of services, transmits feedback for the plurality of services, a plurality of PUCCH transmissions may be performed. However, this operation may consume the power of the UE.

Therefore, proposed herein is a method for periodic uplink resource configuration (e.g., uplink configured grant, SPS UL resource Config.) for DL broadcast/multicast transmission for reporting MBMS-related feedback regardless of the state of the UE.

Hereinafter, DL/UL BWP(s) is assumed as an example of a frequency band related to the MBMS service. However, the present disclosure is not limited to the term "BWP" and the expression of DL/UL BWP(s) may be interpreted as intended to cover various frequency sizes/resources corresponding to parts of the entire DL/UL frequency band. For example, a UE-common (BWP frequency) resource on which the MBMS service is provided may be referred to simply as a common frequency resource (CFR). Although a configured grant (CG) is assumed as an example of periodic UL resource configuration, the present disclosure is not limited thereto.

According to an embodiment of the present disclosure, a UE may operate as follows.

A UE may configure a DL BWP, a UL BWP, and one or more (periodic) UL resources (e.g., CG) for the UL BWP, wherein the UE may receive a MBMS service on the DL BWP and transmit MBMS feedback on the UL BWP.
 a. The UL BWP may be one of an initial UL BWP, a default UL BWP, a configured UL BWP, an active UL BWP and an MBMS specific UL BWP.
 b. The UE may receive configuration of one or more PUCCH resource sets and/or one or more UL configured grants.
 c. At least one of the UL CGs can be mapped to/associated with one of one or more G-RNTIs, one or more TMGIs including the TMGI of the MBMS service, one or more MCCH channels and one or more MTCH channels.
 d. Each CG may be associated to a CG Index.
The UE may monitor PDCCH on a SS set on the DL BWP.
The UE may receive, on the DL BWP for the MBMS service, a PDSCH carrying MCCH/MTCH TB and DCI indicating activation and a CG index based on G-RNTI for a PDCCH.
The UE may activate the UL CG associated to the CG Index.
When the time advance timer (TAT) is running (i.e. UL sync. timing is maintained) and any activated UL CG is mapped to/associated with one of the TMGI of the MBMS service, the G-RNTI, MCCH, MTCH and the DL/UL BWP, the UE can transmit PUSCH on the UL CG for MBMS feedback transmission to the network.
If the TAT is not running or expires (i.e. UL timing is not maintained), or if there is no valid (activated) UL CG which is mapped to/associated with one of the TMGI of the MBMS service, the G-RNTI, MCCH, MTCH and the DL/UL BWP, the UE can deactivate the UL CG and trigger RACH to send MBMS feedback to the network.
 a. The MBMS feedback information may be indicated by one of a RACH preamble, a MSGA and MSG3.
 b. The MBMS feedback may include a MAC control element including at least one or more of HARQ ACK/NACK to the PDSCH transmission and CQI report for PDSCH transmissions of at least the MBMS service.
 c. The MAC control element can also include a list of HARQ ACKs/NACKs to multiple PDSCH transmissions corresponding to different MBMS services with different TMGIs/G-RNTIs received by the UE.
 d. The MBMS feedback may indicate activation or deactivation of the UL CG.

Transmitting Side (e.g., BS):

If a cell is broadcasting an MBMS service, the BS may transmit at least one of SIB1, MBMS system information block (SIB), one or more MCCHs, and one or more MTCHs. Here, the MCCH and the MTCH, which are logical channels, may be transmitted on a physical channel, PDSCH, and may be scheduled on the PDCCH. The MCCH may carry MBMS control information, and one MTCH may carry specific MBMS service data.

The BS may provide a BWP (i.e., MBMS BWP) for MBMS to UEs. The MBMS BWP may include at least one of an MBMS SIB DL BWP and MBMS SIB UL BWP for MBMS SIB transmission and reception, an MCCH DL BWP and MCCH UL BWP for MCCH transmission and reception, and an MTCH DL BWP and MTCH UL BWP for MTCH transmission and reception. That is, one cell may provide zero or one or more MBMS DL BWPs and zero or one or more MBMS UL BWPs. Accordingly, a BS supporting MBMS may provide all the above MBMS BWP types separately from the conventional initial BWP or UE-dedicated BWP, or may provide only zero or some MBMS BWPs. Some or all MBMS BWPs may be the same as or different from the conventional initial BWP, a default BWP, a first active BWP, or an active BWP.

The UE may configure SC-RNTI and MCCH transmission according to MBMS SIB or MBMS control information provided by the BS. Here, the MBMS SIB or MBMS control information may configure a DL BWP and UL BWP for the MBMS.

The MBMS SIB or MBMS control information may include at least part of the following information.

Configuration of Periodic UL Resource (e.g., UL Configured Grant) for MBMS-Related Feedback a. The configuration information for each periodic UL resource (e.g., UL configured grant) may include a specific index (e.g., CG index) and include a period of a UL resource, frequency/time resource information, and/or a time offset at which the CG resource starts, which are required for UL resource calculation.
b. Each periodic UL resource (e.g., UL configured grant), that is, a specific index (e.g., CG index) may be mapped to/associated with at least one of a specific service ID (TMGI), a specific G-RNTI, a specific MBMS DL BWP, a specific MTCH channel(s), or a specific MCCH channel(s).
c. Type 1 or Type 2 CG RACH Resource for MBMS Related Feedback a. RACH resource information mapped to/associated with at least one of a specific service ID (TMGI), a specific G-RNTI, a specific MBMS DL BWP, a specific MTCH channel(s), or a specific MCCH channel(s) may be provided. For example, a specific RACH preamble, a preamble occasion, or a RACH occasion may be mapped to the specific service ID (TMGI), specific G-RNTI, specific MBMS DL BWP, specific MTCH channel(s), or specific MCCH channel(s).

Figure 8:
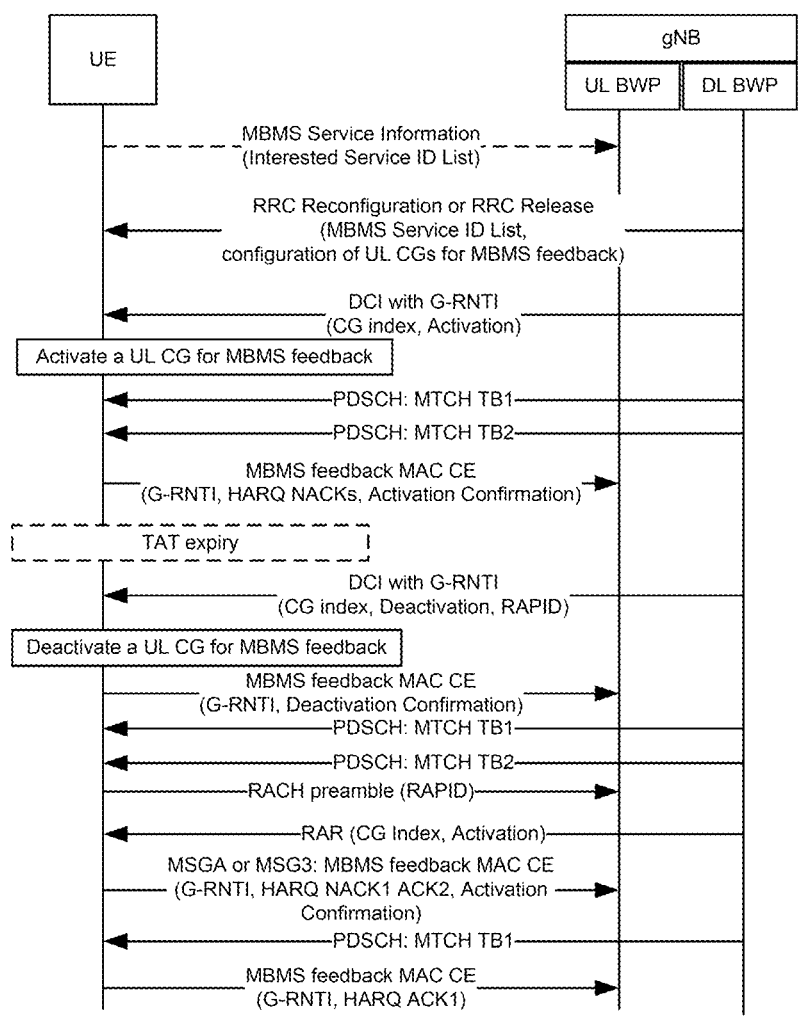
FIG. 8 illustrates an MBMS-related feedback scheme according to an embodiment of the present disclosure.

In FIG. 8, the BS may provide MBMS transmission on a UL BWP and DL BWP. For example, MCCH control information and MTCH transmission may be provided on the DL BWP. Also, MBMS-related feedback of PDSCH transmission for the MCCH or MBMS-related feedback of PDSCH transmission for the MTCH may be provided on the UL BWP. It may be used for reporting of HARQ ACK/NACK for the MBMS-related feedback or a MBMS-related SSB/CSI-RS measurement result.

The BS may configure periodic UL resources (e.g., UL configured grants) for MBMS-related feedback. Also, the BS may provide specific RACH preambles and specific RACH resources for the MBMS-related feedback.

Receiving Side (e.g., UE):

Hereinafter, the UE operation will be described. FIG. 8 illustrates an MBMS-related feedback scheme according to the present disclosure. Here, the UE is in one of idle/inactive/connected modes.

The UE may configure at least one DL BWP and one UL BWP for MBMS reception. The UE may receive MBMS control information or MTCH TB on the DL BWP. The UE may transmit MBMS-related feedback for the control information or MTCH TB on the UL BWP connected to the DL BWP.

The BS may configure one or more periodic UL resources (e.g., UL configured grants) on the UL BWP for the UE. This configuration may be delivered to the idle/inactive/connected UE through system information, MBMS control information, and/or a UE-dedicated message. As shown in FIG. 8, when the BS switches the connected UE receiving the MBMS to the idle/inactive mode, the RRC Release message transmitted by the BS to the UE may include periodic UL resource/configuration (e.g., UL CG configuration) information. The RRC Release message may also include RACH configuration information for MBMS-related feedback, which will be described later.

One periodic UL resource/configuration (e.g., UL CG) indicated by one specific index (e.g., CG index) may be mapped to/associated with at least one of one or more G-RNTIs, one or more DL BWPs, one or more UL BWPs, one or more MCCHs, one or more MTCHs, or one or more MBMS service IDs (e.g., TMGIs). In this case, the periodic UL resource/configuration (e.g., UL CG) resource may be shared by all UEs receiving the MBMS transmission or may be a UE-specific periodic UL resource/configuration (e.g., UL CG) resource. When the resource is shared, all idle/inactive/connected UEs may send a report through the corresponding periodic UL resource (e.g., CG) PUSCH resource.

When a periodic UL resource (e.g., UL CG) is configured and a PDCCH/PDSCH for the mapped MCCH TB or MTCH TB is received, the UE may activate the corresponding UL BWP and periodic UL resource (e.g., UL CG) Type 1 to transmit MBMS-related feedback on the PUSCH. Alternatively, when the DCI for the MCCH TB or MTCH TB includes an indicator for activating periodic UL resource (e.g., UL CG) Type 2 with a specific index (e.g., CG Index), the UE may activate the corresponding UL BWP and periodic UL resource (e.g., UL CG) Type 2 to transmit MBMS-related feedback on the PUSCH.

According to the mapping indication from the BS, a specific frequency/time resource of a specific periodic UL resource (e.g., UL CG) or a specific periodic UL resource (e.g., UL CG) mapped to the specific index (e.g., CG Index) may be valid in at least one of the following cases:

The corresponding MCCH or MTCH is mapped to the periodic UL resource (e.g., UL CG) or configuration;
G-RNTI for TB transmission is mapped to the periodic UL resource (e.g., UL CG) or configuration;
The MBMS service ID (TMGI) for the TB is mapped to the periodic UL resource (e.g., UL CG) or configuration;
The DL BWP in which the TB is transmitted is mapped to the periodic UL resource (e.g., UL CG) or configuration; and
The UL BWP in which MBMS-related feedback for the TB is transmitted is mapped to the periodic UL resource (e.g., UL CG) or configuration.

The UE may determine that the periodic UL resource (e.g., UL CG) or configuration may be valid according to the mapping only when the resource or configuration is activated.

In FIG. 8, the UE may receive DCI and MTCH TB. The CRC of the DCI may be scrambled with a G-RNTI mapped to a received service. Specifically, the BS may map one or more MBMS service IDs to a specific MBMS search space set (hereinafter referred to as MSS set). In the present disclosure, the MSS may be defined as a new type of CSS, a USS, or a new search space other than the CSS/USS.

The UE may activate the DL BWP in which the MBMS service to be received is transmitted, and monitor the PDCCH through a specific MSS set mapped to the MBMS service. The UE may monitor the PDCCH through the MSS and receive DCI with which the CRC is scrambled using the G-RNTI mapped to the service. The UE may receive MBMS service data (e.g., MTCH TB in FIG. 8) by receiving the PDSCH transmission indicated by the DCI.

Here, the PDSCH carrying the MTCH TB (or MCCH TB) may be a bundle transmission or multiple TB transmissions composed of two or more PDSCH transmissions. In the case of the bundle transmission, two PDSCHs may repeatedly transmit the same TB, and the UE may acquire one TB by soft combining of the two transmissions. The UE may transmit one HARQ ACK or NACK after transmissions as many as the number of transmissions in one bundle. In the case of the multiple TB transmissions, two PDSCHs may carry different TBs. In this case, the UE may receive two transmissions through a separate HARQ buffer. Accordingly, the UE may report HARQ A/N results for each of two TBs through one periodic UL resource (e.g., UL CG) or configured PUSCH transmission.

In this case, the HARQ feedback may be transmitted through uplink control information (UCI) or a MAC control element (MAC CE). For example, the MAC CE is an MBMS-related feedback MAC CE. The MBMS-related feedback MAC CE may include a service ID field indicating the TMGI or G-RNTI of each TB and an ACK/NACK indicator field, for transmission of one or more TBs mapped to periodic UL resources (e.g., UL CGs) or configurations for transmitting the MAC CE. If multiple TBs are scheduled through a single DCI as shown in FIG. 8, the MBMS-related feedback MAC CE may include one service ID field and ACK/NACK indicator fields corresponding thereto because the same G-RNTI is used. The different ACK/NACK indicator fields may indicate decoding statuses of the different TBs. The MBMS-related feedback MAC CE may be identified through a specific LCID of the UL MAC PDU header.

As shown in FIG. 8, a certain DCI may indicate activation of a periodic UL resource (e.g., UL CG) or configuration mapped to a specific index (e.g., CG index) while scheduling TB transmission through the G-RNTI. In this case, the UE may activate the periodic UL resource (e.g., CG) and transmit the UCI or MBMS-related feedback MAC CE through the periodic UL resource (e.g., CG) mapped to the TB transmission. Here, the UCI or MBMS-related feedback MAC CE may indicate an ACK/NACK indicator for the TB and the specific index (e.g., CG Index) for (CG) activation confirmation. To this end, the MBMS-related feedback MAC CE may include one specific index (e.g., CG index) field corresponding to one service ID field.

In this operation, the UE may transmit the UCI or MBMS-related feedback MAC CE only when the periodic UL resource (e.g., UL CG) or configuration is valid. In at least one of a case where there is no valid periodic UL resource (e.g., UL CG) or configuration for the MCCH TB or MTCH TB, a case where there is no PUCCH resource dedicated to the UE, a case where the valid periodic UL resource (e.g., UL CG) or configuration is deactivated/released, or a case where the time adjustment timer (TAT) driven by the UE to maintain the UL timing is not running or has expired, the UE may deactivate the periodic UL resource (e.g., UL CG) or configuration, and trigger a RACH to transmit the MBMS-related feedback MAC CE. In this case, a C-RNTI MAC CE (for reporting UE ID) and an activation/deactivation confirmation MAC CE related to the periodic UL resource (e.g., UL CG) or configuration (for confirming UL CG deactivation) may be transmitted together through the RO PUSCH resource of the RACH.

Alternatively, the MBMS-related feedback MAC CE transmitted on the RACH PUSCH may include the UL specific index (e.g., CG index) field to confirm deactivation.

Accordingly, the UCI or MBMS-related feedback MAC CE transmitted on a specific UL frequency/time resource for the specific index (e.g., CG Index) may include at least a part of the following information/fields:

Service ID (e.g., TMGI or G-RNTI) for transmission of one or more TBs mapped to/associated with the periodic UL resource (e.g., UL CG) or configuration;

One or more HARQ ACK or NACK indicators for transmission of one or more TBs mapped to the periodic UL resource (e.g., UL CG) or configuration;

Confirmation for activation or deactivation/release of a periodic UL resource (e.g., UL CG) or configuration corresponding to the specific index (e.g., CG index); and UE ID (e.g. C-RNTI) of the UE.

When the UCI or MBMS-related feedback MAC CE is transmitted on the RACH, a specific RACH preamble ID may be mapped/associated as follows:

The RACH preamble ID is mapped to/associated with the corresponding MCCH or MTCH channel;

A G-RNTI for TB transmission is mapped to/associated with the RACH preamble ID;

MBMS service ID (TMGI) for TB is mapped to/associated with the RACH preamble ID;

A DL BWP through which a TB is transmitted is mapped to/associated with the RACH preamble ID; or A UL BWP through which MBMS-related feedback for the TB is transmitted is mapped to/associated with the RACH preamble ID.

When the mapped/associated RACH preamble ID is present, the UE may perform contention-free RACH transmission according to the mapped/associated RACH preamble ID. Accordingly, after the RACH preamble is transmitted and a random access response (RAR) or a PDCCH is received, the RACH procedure may be terminated.

When the mapped/associated RACH preamble ID is not present in a 4-Step RACH, the UE may randomly select a RACH preamble ID and perform contention-based RACH transmission. Accordingly, upon receiving the RAR after transmitting the RACH preamble, the UE may transmit MSG3 and terminate the RACH procedure.

When the mapped/associated RACH preamble ID is not present in a 2-step RACH, the UE may randomly select a RACH preamble ID and transmit the selected RACH preamble ID and MSGA. After the transmission, the UE may receive an MSGB and terminate the RACH procedure.

For the RACH transmission, the UE may determine a RACH preamble occasion (PO) and/or a RACH occasion (RO) for MSG3/MSGA PUSCH transmission according to the following mapping/association:

The corresponding MCCH or MTCH is mapped to/associated with a specific PO/RO;

A G-RNTI for TB transmission is mapped to a specific PO/RO;

An MBMS service ID (TMGI) for a TB is mapped to/associated with a specific PO/RO;

A DL BWP through which the TB is transmitted is mapped to/associated with a specific PO/RO; and A UL BWP through which MBMS-related feedback for the TB is transmitted is mapped/associated with a specific PO/RO.

The BS may activate or deactivate a periodic UL resource (e.g., UL CG) or configuration for MBMS-related feedback by transmitting an RAR. For example, when a specific periodic UL resource (e.g., UL CG) or configuration is deactivated through TAT expiration or a deactivation/release indication of the BS as shown in FIG. 8, the UE may trigger the RACH for MBMS-related feedback transmission. In this case, since the UL timing is synchronized, the BS may indicate a specific index (e.g., CG index) and an activation/deactivation indicator through the RAR, and thus the UE may activate the periodic UL resources (e.g., UL CG) or configuration again for the MBMS-related feedback. To this end, the RAR MAC CE may include a periodic UL resource-related index field and an activation/deactivation indicator field. In the case of 2-step RACH, the MSGB MAC CE may include an index field and an activation/deactivation indicator field.

The UE may change the beam/TRP/TCI state for MBMS reception through the RACH procedure. In this case, the UE may monitor the PDCCH occasion using the CORSET/MSS set mapped to the changed beam/TRP/TCI state. The UE may receive DCI with G-RNTI on the PDCCH.

When the MTCH TB is successfully received or when the MTCH TB corresponds to the last transmission, the UE may transmit a HARQ ACK for the last MTCH TB or skip the HARQ ACK. In the case where the UE skips the HARQ ACK, the UE may skip the periodic UL resource (e.g., UL CG) or configuration, and may not trigger the RACH.

The BS may indicate the value of N such that a PUCCH or periodic UL resource (e.g., UL CG) or configuration is selected according to the number of MTCH/MCCH TBs (per unit time) that a specific UE receives. For example, when the UE receives only N or fewer MTCH/MCCH TB(s) and is to transmit HARQ feedback, the UE may transmit the HARQ feedback through a UE-specific PUCCH resource or a UE-common PUCCH resource for the corresponding MTCH/MCCH TB rather than through the periodic UL resource (e.g., UL CG) or configuration. When the UE receives N or more MTCH/MCCH TBs and is to transmit HARQ feedback, the UE may transmit a plurality of HARQ feedbacks through the periodic UL resource (e.g., UL CG) or configuration.

In an embodiment of the present disclosure, in transmitting feedback for a plurality of broadcast/multicast services, the UE may activate a specific periodic UL resource (e.g., UL CG) or configuration and transmit feedback for the plurality of services through a single PUSCH transmission. Thereby, efficient feedback reporting may be implemented.

Figure 9:
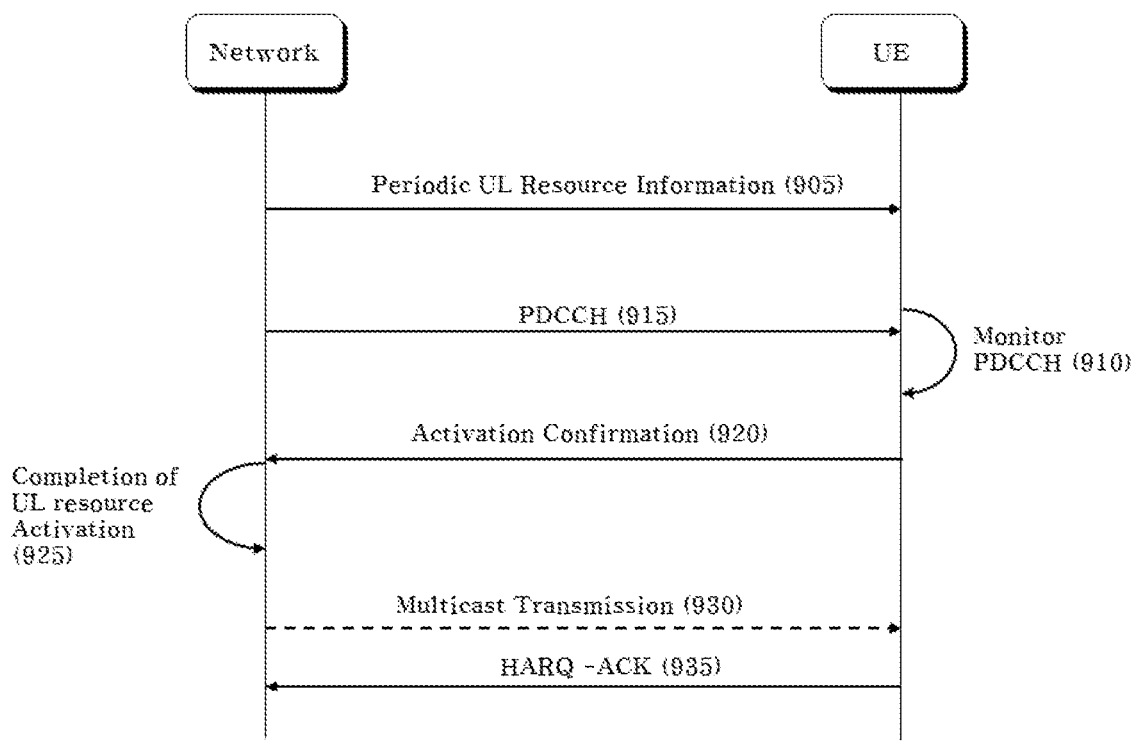
FIG. 9 illustrates a signal transmission/reception method according to an embodiment of the present disclosure.

FIG. 9 illustrates a signal transmission/reception method according to an embodiment of the present disclosure.

The UE may receive information about one or more periodic uplink resources for transmission of hybrid automatic repeat request (HARQ-ACK) information for multicast data (operation 905).

The UE may monitor a physical downlink control channel (PDCCH) in a search space for multicast configured on a specific downlink frequency resource (operation 910).

In the search space for multicast configured on the specific downlink frequency resource, the BS may transmit a PDCCH carrying DCI in which a cyclic redundancy check (CRC) is scrambled with a group-radio network temporary identifier (G-RNTI) (operation 915). As a result of the monitoring of the PDCCH, the UE may detect the DCI in which the CRC is scrambled with the G-RNTI.

The UE may transmit an activation confirmation message on the basis that the DCI indicates a specific index, and at least one of one or more periodic uplink resources is associated with the specific index indicated by the DCI (operation 920). By transmitting the activation confirmation message, the UE may activate at least one periodic uplink resource associated with the specific index.

The BS attempts to receive an activation confirmation message from the UE on the basis that the DCI indicates the specific index, and at least one of the one or more periodic uplink resources is associated with the specific index indicated by the DCI, and may determine that at least one periodic uplink resource has been successfully activated for the UE on the basis that the activation confirmation message is received (operation 925).

The activation confirmation message may be transmitted through the at least one periodic uplink resource associated with the specific index.

HARQ-ACK information for the multicast data 930 may be transmitted after activation of the at least one periodic uplink resource (operation 935).

The activation confirmation message or HARQ-ACK information for the multicast data may be transmitted on the basis that a timer for uplink timing of the UE is valid.

After the timer for uplink timing of the UE expires, transmission of the activation confirmation message or HARQ-ACK information for the multicast data may not be allowed.

The specific index may be a periodic uplink resource identifier.

The specific downlink frequency resource may be related to an active BWP of the UE.

The activation confirmation message or HARQ-ACK information for the multicast data may be transmitted as at least part of UCI.

The UCI may be transmitted on a PUSCH.

The various descriptions, functions, procedures, proposals, methods, and/or operation flowcharts of the present disclosure described herein may be applied to, but not limited to, various fields requiring wireless communication/connectivity (e.g., 5G) between devices.

More specific examples will be described below with reference to the drawings. In the following drawings/description, like reference numerals denote the same or corresponding hardware blocks, software blocks, or function blocks, unless otherwise specified.

Figure 10:
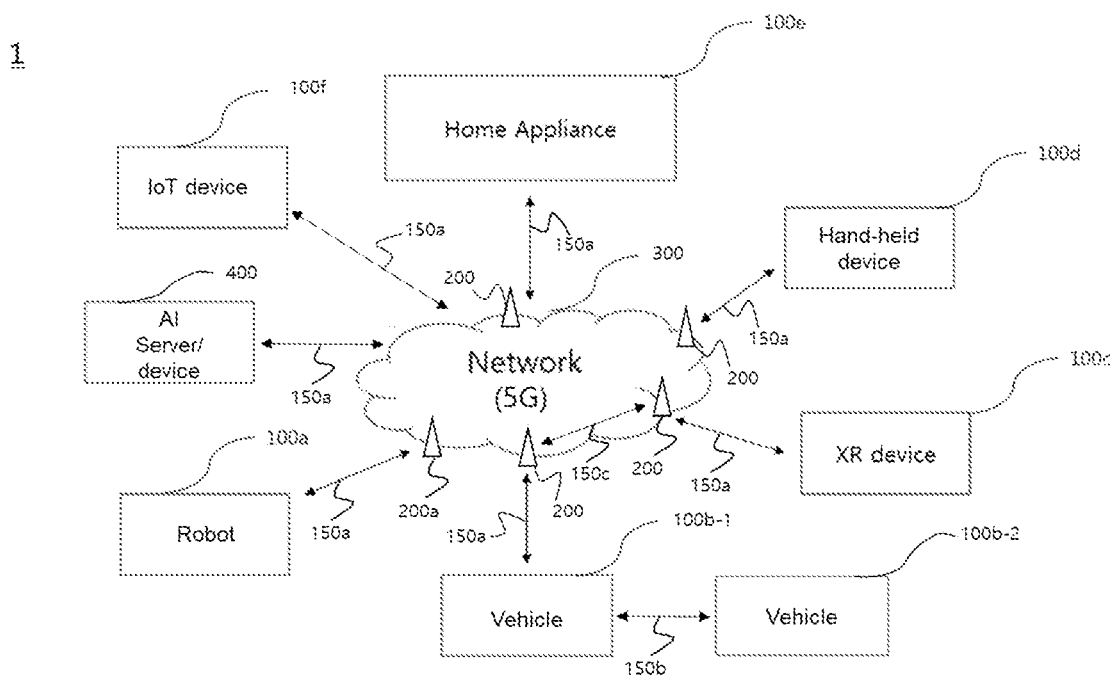
FIGS. 10 to 13 illustrate a communication system 1 and wireless devices applied to the present disclosure.

FIG. 10 illustrates a communication system 1 applied to the present disclosure.

Referring to FIG. 10, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an eXtended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head- Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 11:
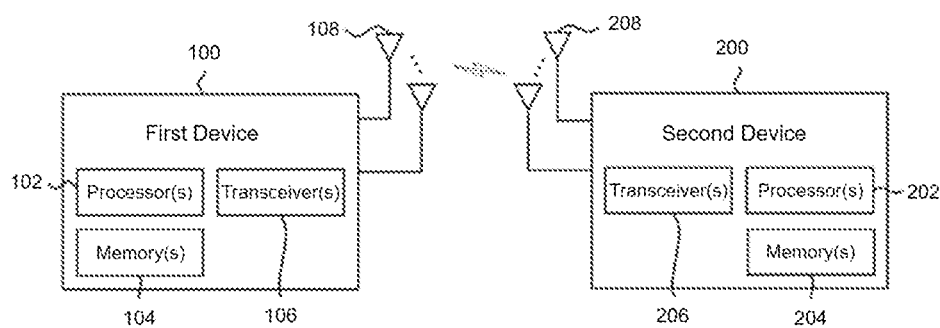

FIG. 11 illustrates wireless devices applicable to the present disclosure.

Referring to FIG. 11, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 10.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 12:
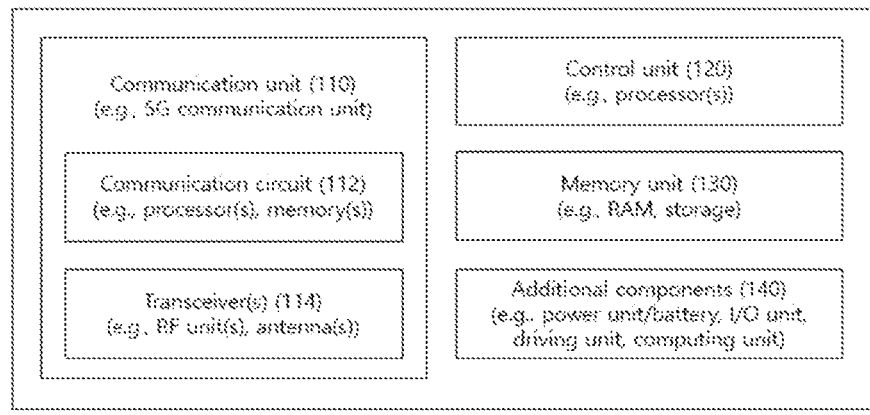

FIG. 12 illustrates another example of a wireless device applied to the present disclosure. The wireless device may be implemented in various forms according to a use-case/service (refer to FIG. 12).

Referring to FIG. 12, wireless devices 100 and 200 may correspond to the wireless devices 100 and 200 of FIG. 11 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 11. For example, the transceiver(s) 114 may include the one or more transceivers 106 and 206 and/or the one or more antennas 108 and 208 of FIG. 11. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 10), the vehicles (100b-1 and 100b-2 of FIG. 10), the XR device (100c of FIG. 10), the hand-held device (100d of FIG. 10), the home appliance (100e of FIG. 10), the IoT device (100f of FIG. 10), a digital broadcast terminal, a hologram device, a public safety device, an MTC device, a medicine device, a fintech device (or a finance device), a security device, a climate/environment device, the AI server/device (400 of FIG. 10), the BSs (200 of FIG. 10), a network node, etc. The wireless device may be used in a mobile or fixed place according to a use-example/service.

In FIG. 12, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 13:
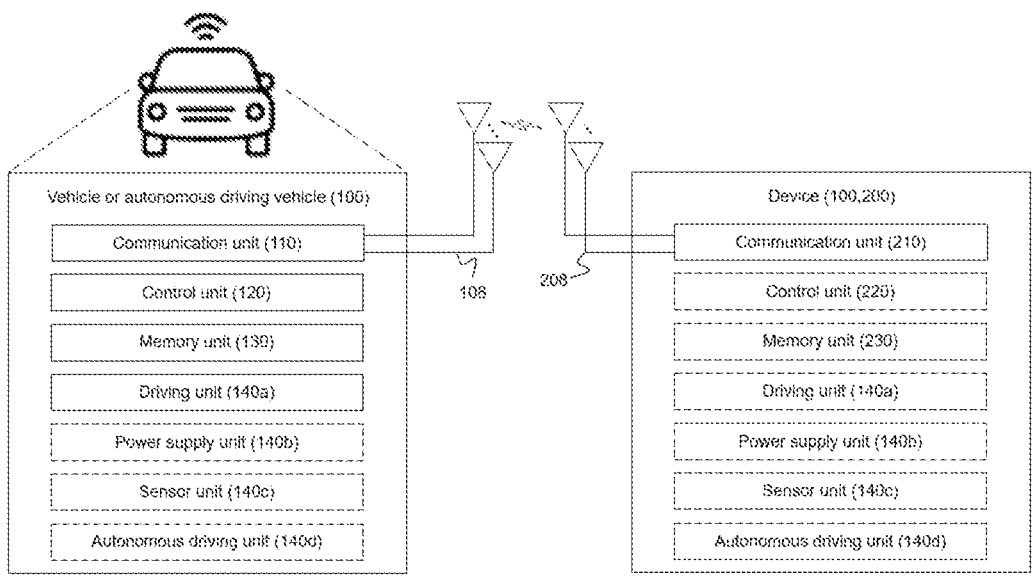

FIG. 13 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 13, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 12, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Figure 14:
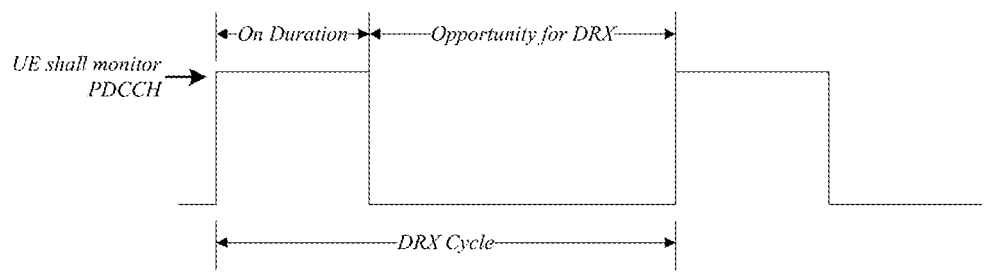
FIG. 14 illustrates an exemplary discontinuous reception (DRX) operation applied to the present disclosure.

FIG. 14 is a diagram illustrating a DRX operation of a UE according to an embodiment of the present disclosure.

The UE may perform a DRX operation in the afore-described/proposed procedures and/or methods. A UE configured with DRX may reduce power consumption by receiving a DL signal discontinuously. DRX may be performed in an RRC_IDLE state, an RRC_INACTIVE state, and an RRC_CONNECTED state. The UE performs DRX to receive a paging signal discontinuously in the RRC_IDLE state and the RRC_INACTIVE state. DRX in the RRC_CONNECTED state (RRC_CONNECTED DRX) will be described below.

Referring to FIG. 14, a DRX cycle includes an On Duration and an Opportunity for DRX. The DRX cycle defines a time interval between periodic repetitions of the On Duration. The On Duration is a time period during which the UE monitors a PDCCH. When the UE is configured with DRX, the UE performs PDCCH monitoring during the On Duration. When the UE successfully detects a PDCCH during the PDCCH monitoring, the UE starts an inactivity timer and is kept awake. On the contrary, when the UE fails in detecting any PDCCH during the PDCCH monitoring, the UE transitions to a sleep state after the On Duration. Accordingly, when DRX is configured, PDCCH monitoring/reception may be performed discontinuously in the time domain in the afore-described/proposed procedures and/or methods. For example, when DRX is configured, PDCCH reception occasions (e.g., slots with PDCCH SSs) may be configured discontinuously according to a DRX configuration in the present disclosure. On the contrary, when DRX is not configured, PDCCH monitoring/reception may be performed continuously in the time domain. For example, when DRX is not configured, PDCCH reception occasions (e.g., slots with PDCCH SSs) may be configured continuously in the present disclosure. Irrespective of whether DRX is configured, PDCCH monitoring may be restricted during a time period configured as a measurement gap.

Table 5 describes a DRX operation of a UE (in the RRC_CONNECTED state). Referring to Table 5, DRX configuration information is received by higher-layer signaling (e.g., RRC signaling), and DRX ON/OFF is controlled by a DRX command from the MAC layer. Once DRX is configured, the UE may perform PDCCH monitoring discontinuously in performing the afore-described/proposed procedures and/or methods, as illustrated in FIG. 5.

TABLE 5

|  | Type of signals | UE procedure |
| --- | --- | --- |
| 1$^{st}$ Step | RRC signalling(MAC-CellGroupConfig) | Receive DRX configuration information |
| 2$^{nd}$ Step | MAC CE((Long) DRX command MAC CE) | Receive DRX command |
| 3$^{rd}$ Step | — | Monitor a PDCCH during an on-duration of a DRX cycle |

MAC-CellGroupConfig includes configuration information required to configure MAC parameters for a cell group. MAC-CellGroupConfig may also include DRX configuration information. For example, MAC-CellGroupConfig may include the following information in defining DRX.

Value of drx-OnDurationTimer: defines the duration of the starting period of the DRX cycle.

Value of drx-InactivityTimer: defines the duration of a time period during which the UE is awake after a PDCCH occasion in which a PDCCH indicating initial UL or DL data has been detected Value of drx-HARQ-RTT-TimerDL: defines the duration of a maximum time period until a DL retransmission is received after reception of a DL initial transmission.

Value of drx-HARQ-RTT-TimerDL: defines the duration of a maximum time period until a grant for a UL retransmission is received after reception of a grant for a UL initial transmission.

drx-LongCycleStartOffset: defines the duration and starting time of a DRX cycle.

drx-ShortCycle (optional): defines the duration of a short DRX cycle.

When any of drx-OnDurationTimer, drx-InactivityTimer, drx-HARQ-RTT-TimerDL, and drx-HARQ-RTT-TimerDL is running, the UE performs PDCCH monitoring in each PDCCH occasion, staying in the awake state.

The embodiments of the present disclosure described above are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by a subsequent amendment after the application is filed.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

The present disclosure is applicable to UEs, BSs, or other apparatuses in a wireless mobile communication system.

What is claimed is:

1. A method for transmitting a signal by a terminal in a wireless communication system, the method comprising:

receiving information about a plurality of periodic uplink (UL) resources for transmission of hybrid automatic repeat request-acknowledgement (HARQ-ACK) information for multicast data;

monitoring a physical downlink control channel (PDCCH) in a search space for multicast configured on a specific downlink frequency resource;

detecting, as a result of the monitoring of the PDCCH, downlink control information (DCI) having a cyclic redundancy check (CRC) scrambled with a group-radio network temporary identifier (G-RNTI), wherein the DCI includes activation information associated with a first periodic UL resource among the plurality of periodic UL resources; and based on the first periodic UL resource being activated through the activation information, transmitting, through the first periodic UL resource, a message including the HARQ-ACK information and activation confirmation information set to an index of the activated first periodic UL resource.

2. The method of claim 1, wherein the HARQ-ACK information for the multicast data is transmitted after the activation of the first periodic UL resource.

3. The method of claim 1, wherein the message is transmitted during a timer for uplink timing of the terminal is valid.

4. The method of claim 3, wherein transmission of the message is not allowed after the timer for uplink timing of the terminal expires.

5. The method of claim 1, wherein the specific downlink frequency resource is related to an active bandwidth part (BWP) of the terminal.

6. The method of claim 1, wherein the message is transmitted as at least part of uplink control information (UCI).

7. The method of claim 6, wherein the UCI is transmitted on a physical uplink shared channel (PUSCH).

8. A non-transitory medium readable by a processor and storing instructions that, when executed by the processor, cause the processor to perform the method of claim 1.

9. A terminal configured to operate in a wireless communication system, the terminal comprising:

a transceiver; and a processor configured to perform operations, the operations comprising:

receiving information about a plurality of periodic uplink (UL) resources for transmission of hybrid automatic repeat request-acknowledgement (HARQ-ACK) information for multicast data;

monitoring a physical downlink control channel (PDCCH) in a search space for multicast configured on a specific downlink frequency resource; and detecting, as a result of the monitoring of the PDCCH, downlink control information (DCI) having a cyclic redundancy check (CRC) scrambled with a group-radio network temporary identifier (G-RNTI), wherein the DCI includes activation information associated with a first periodic UL resource among the plurality of periodic UL resources, and wherein, based on the first periodic UL resource being activated through the activation information, the operations further comprise transmitting, through the first periodic UL resource, a message including the HARQ-ACK information and activation confirmation information set to an index of the activated first periodic UL resource.

10. A device configured to control a terminal in a wireless communication system, the device comprising:

a memory configured to store instructions; and a processor configured to execute the instructions to perform operations, wherein the operations comprise:

receiving information about a plurality of periodic uplink (UL) resources for transmission of hybrid automatic repeat request-acknowledgement (HARQ-ACK) information for multicast data;

monitoring a physical downlink control channel (PDCCH) in a search space for multicast configured on a specific downlink frequency resource; and detecting, as a result of the monitoring of the PDCCH, downlink control information (DCI) having a cyclic redundancy check (CRC) scrambled with a group-radio network temporary identifier (G-RNTI), wherein the DCI includes activation information associated with a first periodic UL resource among the plurality of periodic UL resources, and wherein, based on the first periodic UL resource being activated through the activation information, the operations further comprise transmitting, through the first periodic UL resource, a message including the HARQ-ACK information and activation confirmation information set to an index of the activated first periodic UL resource.

11. A method for receiving a signal by a base station in a wireless communication system, the method comprising:

transmitting information about a plurality of periodic uplink (UL) resources for reception of hybrid automatic repeat request-acknowledgement (HARQ-ACK) information for multicast data;

transmitting, in a search space for multicast configured on a specific downlink frequency resource, a physical downlink control channel (PDCCH) carrying downlink control information (DCI) having a cyclic redundancy check (CRC) scrambled with a group-radio network temporary identifier (G-RNTI), wherein the DCI includes activation information associated with a first periodic UL resource among the plurality of periodic UL resources; and based on the first periodic UL resource being activated through the activation information, receiving, through the first periodic UL resource, a message including the HARQ-ACK information and activation confirmation information set to an index of the activated first periodic UL resource.

12. A base station configured to operate in a wireless communication system, the base station comprising:

a transceiver; and a processor configured to perform operations, the operations comprising:

transmitting information about a plurality of periodic uplink (UL) resources for transmission of hybrid automatic repeat request-acknowledgement (HARQ-ACK) information for multicast data; and transmitting, in a search space for multicast configured on a specific downlink frequency resource, a physical downlink control channel (PDCCH) carrying downlink control information (DCI) having a cyclic redundancy check (CRC) scrambled with a group-radio network temporary identifier (G-RNTI), wherein the DCI includes activation information associated with a first periodic UL resource among the plurality of periodic UL resources, and wherein, based on the first periodic UL resource being activated through the activation information, the operations further comprise receiving, through the first periodic UL resource, a message including the HARQ-ACK information and activation confirmation information set to an index of the activated first periodic UL resource.

* * * * *